(12) United States Patent
Lu et al.

(10) Patent No.: US 8,369,313 B2
(45) Date of Patent: Feb. 5, 2013

(54) IMS AND METHOD OF MULTIPLE S-CSCF OPERATION IN SUPPORT OF SINGLE PUID

(75) Inventors: Min Lu, Freehold, NJ (US); Mark Ratcliffe, Oakhurst, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1084 days.

(21) Appl. No.: 12/337,375

(22) Filed: Dec. 17, 2008

(65) Prior Publication Data

US 2010/0150137 A1    Jun. 17, 2010

(51) Int. Cl.
*H04L 12/66* (2006.01)
(52) U.S. Cl. ........................................................ 370/352
(58) Field of Classification Search .................. 370/352, 370/353, 354, 328, 389, 471, 902; 709/223, 709/225, 226; 555/433, 432.1, 435.1, 422.1; 455/433, 432.1, 435.1, 422.1
See application file for complete search history.

(56) References Cited

U.S. PATENT DOCUMENTS

| | | | |
|---|---|---|---|
| 7,304,966 B2 | 12/2007 | Phan-Anh et al. | |
| 7,372,840 B2 | 5/2008 | Le et al. | |
| 7,406,057 B2 | 7/2008 | Isomaki et al. | |
| 8,170,005 B2 * | 5/2012 | Mukaiyama et al. | ......... 370/352 |
| 2007/0060042 A1 | 3/2007 | Ko | |
| 2008/0103992 A1 | 5/2008 | Cai et al. | |
| 2008/0201483 A1 | 8/2008 | Chong et al. | |

FOREIGN PATENT DOCUMENTS

| | | |
|---|---|---|
| EP | 1 761 077 | 3/2007 |
| WO | WO 2007028332 | 3/2007 |

\* cited by examiner

*Primary Examiner* — Chi Pham
*Assistant Examiner* — Alexander O Boakye

(57) ABSTRACT

A method for providing multimedia services to subscriber user equipment (UE) within an IP multimedia subsystem network (IMS) may include configuring the IMS to enable a single UE to fork register and cooperate with multiple serving-call session control functions (S-CSCFs). After obtaining IP connectivity, the single UE signals to register with the IMS and the IMS determines whether the UE is configured to fork register with multiple S-CSCFs. If the UE is configured, the IMS determines which S-CSCFs are eligible for the UE registration and fork registers the UE to multiple S-CSCFs of the eligible S-CSCFs. Consequently, incoming and outgoing calls to/from the UE are routed by the IMS to any of the multiple registered S-CSCFs.

18 Claims, 5 Drawing Sheets

IMS AND METHOD OF MULTIPLE S-CSCF OPERATION IN SUPPORT OF SINGLE PUID

BACKGROUND

The present invention broadly relates to an Internet protocol multimedia network subsystem (IMS) and, more particularly relates to an IMS network by which subscriber user equipment (UE) registration is forked to multiple serving call session control functions (S-CSCFs).

An IMS is a standardized set of architecture specifications of the Third Generation Partnership Project (3GPP) that provides mobile and fixed multimedia services. IMS uses a Voice over Internet Protocol (VoIP) implementation that is backward compatible with existing phone systems that use packet-switched or circuit switched technologies. The basic principles of IMS and 3GPP are well known by those skilled in the art (see http://www.3gpp.org). IMS is structured to include private and public identification numbers for user equipment (UE). The public user identity (PUID) is analogous to the telephone number used in the old PSTN system, but in the format of a session initiation protocol (SIP) universal resource identity (URI) or a Tel URI format. Tel URI format is used for conventional E.164 numbers. The definitions and specifications for Tel URI and SIP URI can be found in RFC3966, 3261 and 2396.

The private user identity (PRID) is a unique global identity assigned by the network operator to identify the user associated with the user equipment (UE). The PRID is used exclusively for identification and authentication purposes (registration, authorization, administration and accounting functions in IMS) and not for routing of SIP requests to the user. Each user may be assigned one or more PRIDs and PUIDs. The PRID is in the form of a network access identifier (NAI) scheme, as defined in RFC2486 (http://rfc.net/rfc2486.html). As the IMS network uses session initiation protocol (SIP) for the registration process to admit a subscriber onto the network. The IMS network relies largely on the PRID for subscriber authentication and session establishment of a secured channel. Once the registration is completed, the serving call session control function (S-CSCF) establishes a predetermined relation between the public user ID (PUID) and the current location of the subscriber. As such, regardless of the particular location of the subscriber (i.e., the UE), either in its home network or in any other roaming network, the PUID can be used to call the subscriber (i.e., the UE) through network routing.

As such, session initiation protocol (SIP) registration of a conventional IP multimedia system (IMS) creates a single public user ID (PUID) that is bound to a single serving-call session control function (S-CSCF). As a result, if the UE-associated S-CSCF fails, no incoming calls or outgoing calls can be made to/from that UE until a "next" registration occurs. This results in call failures until the user registration occurs which will result in selection of a new S-CSCF.

SUMMARY

The disclosed technology provides for forking the registration of a single subscriber user equipment (UE) to multiple serving-call session control functions (S-CSCFs) in an IP multimedia subsystem network (IMS). In subsequent post-registration incoming and outgoing call operation, the UE so registered is not bound to a single S-CSCF. This ability to fork registrations to multiple S-CSCFs addresses the case where an intended S-CSCF is somehow unavailable resulting in call failures to or from the UE, a known problem in prior art IMS operation.

The multiple S-CSCFs are thereafter capable of processing incoming and outgoing calls to/from the user equipment (UE). The IMS randomly chooses, or chooses by some criteria or algorithm, one of the multiple S-CSCFs, e.g., from a list, for use in processing calls to the UE and calls from the UE. By associating the UE with multiple S-CSCFs, the load or distribution of traffic among the multiple S-CSCFs may be more evenly divided, thereby improving the scalability of the IMS network. Such improvement is particularly critical where the UE is an aggregate endpoint that generates a substantial amount of traffic, e.g., via an Internet protocol private branch exchange (IP PBX). By having the ability to rely on multiple S-CSCFs, the inventive operation avoids the S-CSCF single point of failure improving overall IMS network reliability.

In a method embodiment, the disclosed technology provides multimedia services to subscriber user equipment (UE) within an IP multimedia subsystem network (IMS). The method includes configuring the IMS to provide a single UE with a capability of forking registrations to register with multiple serving-call session control functions (S-CSCFs). Preferably, after obtaining IP connectivity, the single UE registers onto the IMS and based on the registration forking configuration, the IMS responds by forking the registration of the single UE to multiple eligible S-CSCFs. The step of configuring includes setting a multiple S-CSCF forking data field for the single UE. The multiple S-CSCF forking data field is maintained by a home subscriber server (HSS) associated with the single UE. The single UE signalling includes signalling to register with a proxy-CSCF (P-CSCF), the P-CSCF signalling the registration to an interrogating-CSCF (I-CSCF) and the I-CSCF querying the HSS to select the S-CSCF.

The method includes the HSS responding to the I-CSCF by determining whether the single UE is already registered, and whether the single UE is enabled to support forking the registration to multiple S-CSCFs. The HSS signals to the I-CSCF with eligible S-CSCF capabilities if the multiple S-CSCF forking data field is set and the I-CSCF chooses the multiple S-CSCFs from the eligible S-CSCFs, and signals registration to the chosen, eligible multiple S-CSCFs. The chosen multiple S-CSCFs challenge and signal the single UE via the I-CSCF and the P-CSCF. Upon receiving multiple S-CSCF challenges, the UE signals multiple registration messages with credentials to the multiple S-CSCFs via the P-CSCF and I-CSCF. The multiple S-CSCFs exchange signals with the HSS. The HSS records the binding of the fork registrations and sends user profile information to each of the multiple S-CSCFs. Each of the multiple S-CSCFs signal the I-CSCF, which responds by signalling the P-CSCF, releasing all registration information, storing home network contact information and signalling the UE. After the registration, the P-CSCF creates and stores a list of the multiple S-CSCFs and also creates multiple security association (SA) connections with the UE.

The UE then selects, using an algorithm (random, prioritized, weighted, etc), one of the SA with P-CSCF for an outgoing call. The P-CSCF signals to the associated S-CSCF. If the S-CSCF is not available, the error will be signalled back to P-CSCF and UE, and the UE will try a different SA with P-CSCF and S-CSCF. In the case of an incoming call to the fork registered UE, for example, a call originating from the PSTN routes to the I-CSCF in UE's IMS network via MGCF/MGW/SG, or a call from an originating S-CSCF (i.e., IMS IP originated calls) routes to the I-CSCF in UE's IMS network. The I-CSCF queries the HSS for the "fork registered" terminating S-CSCF, and upon return of the requested information from the HSS, selects using an algorithm (random, prioritized, weighted, etc) and routes to one of the "fork registered" S-CSCFs for terminating services. After providing terminating services, the "fork registered" S-CSCF routes to the P-CSCF and finally the UE. If the chosen "fork registered" S-CSCF is unavailable, the I-CSCF can choose another one from the multiple "fork registered" S-CSCF pool.

The disclosed technology includes a computer readable medium encoded with computer program instructions for providing multimedia services to subscriber user equipment (UE) within an IP multimedia subsystem network (IMS). The computer program instructions define a step of configuring the IMS to provide a single UE with a capability of forking a registration to multiple serving-call session control functions (S-CSCFs). The computer program instructions further define steps wherein, after obtaining IP connectivity, the single UE register signals the IMS in response to which the IMS fork registers the single UE to multiple S-CSCFs. The subject matter inherent in the computer program instructions is quite similar to the subject matter of the method steps set forth in detail above.

The disclosed technology further includes an Internet Protocol multimedia subsystem network (IMS) for managing multimedia services that enables single subscriber user equipment (UE) to fork register with multiple serving-call session control functions (S-CSCFs). The IMS comprises a single UE, a Home Subscriber Server (HSS) for managing the subscriber profile of the single UE including maintaining a field indicating whether the single UE is enabled for multiple S-CSCF operation and multiple S-CSCFs to which the single UE fork registers in cooperation with the HSS. Upon the single UE fork registering to the multiple S-CSCFs, the IMS responds to incoming and outgoing calls to/from the single UE by choosing one of the multiple registered S-CSCFs in cooperation with the stored fork registration information associated with the UE. If one of the multiple S-CSCFs is unavailable for an incoming or outgoing call, an alternative one of the multiple S-CSCFs is used. A Proxy-CSCF (P-CSCF) and an Interrogating-CSCF (I-CSCF) are further included, wherein the HSS returns eligible S-CSCFs to the I-CSCF, which chooses the eligible S-CSCFs for registration of the multiple S-CSCFs.

The UE chooses which of the SA connections with the P-CSCF and the S-CSCFs to utilize for an outgoing call using an algorithm such as a random choosing process, a priority algorithm, a weighted algorithm or a process based on S-CSCF capacity, for example, without limitation. The I-CSCF chooses which of the multiple S-CSCFs to utilize for an incoming call using a process from a group consisting of a random choosing process, priority algorithm, weighted algorithm or a process based on S-CSCF capacity, for example, without limitation. The IMS may further comprise a media gateway control function (MGCF) that operates as an IMS gateway to the public switched telephone network (PSTN), and a breakout gateway control function (BGCF) that cooperates with the multiple S-CSCFs and the MGCF.

BRIEF DESCRIPTION OF THE DRAWING FIGURES

DETAILED DESCRIPTION

The following provides a detailed description of the disclosed technology. The disclosed technology includes a method for providing multimedia services to subscriber user equipment (UE) within an IP multimedia subsystem network (IMS). In an embodiment of the invention, a forking capability enables the UE to register (using session initiation protocol signalling) with multiple serving-call session control functions (S-CSCFs) thereby avoiding UE service interruption upon S-CSCF failure. Another embodiment of the invention relates to a computer readable medium including a set of computer program instructions that when operated upon by a computer implements the method. Still another embodiment of the invention involves an IMS network in which the method is implemented. The system and method may operate in accordance with session initiation protocol (SIP). SIP is an application-layer control (signalling) protocol for creating, modifying, and terminating sessions with one or more participants. These sessions include Internet telephone calls, multimedia distribution, and multimedia conferences.

After the IMS is configured for intended operation, a UE registers in such a way that the UE is not bound to a single, fixed S-CSCF. That is, the UE fork registers with multiple S-CSCFs (e.g., a list of S-CSCFs) such that alternative S-CSCFs can be called into use in case one or more, but not all of the multiple S-CSCFs, fail during incoming and outgoing calling. This avoids incoming and outgoing call failure such as suffered by the prior art where a single S-CSCF dedicated to a UE might fail. In such prior art operation, a next registration would be required before a call could again be sent or received. The description of an exemplary IMS that can operate according to the disclosed technology, the signal flow required for establishing a fork registration, post registration inbound and outbound call setups where the IMS operates with the novel forking ability and a method for implementing the inventive operation in an IMS network configured for same now follows.

Figure 1:
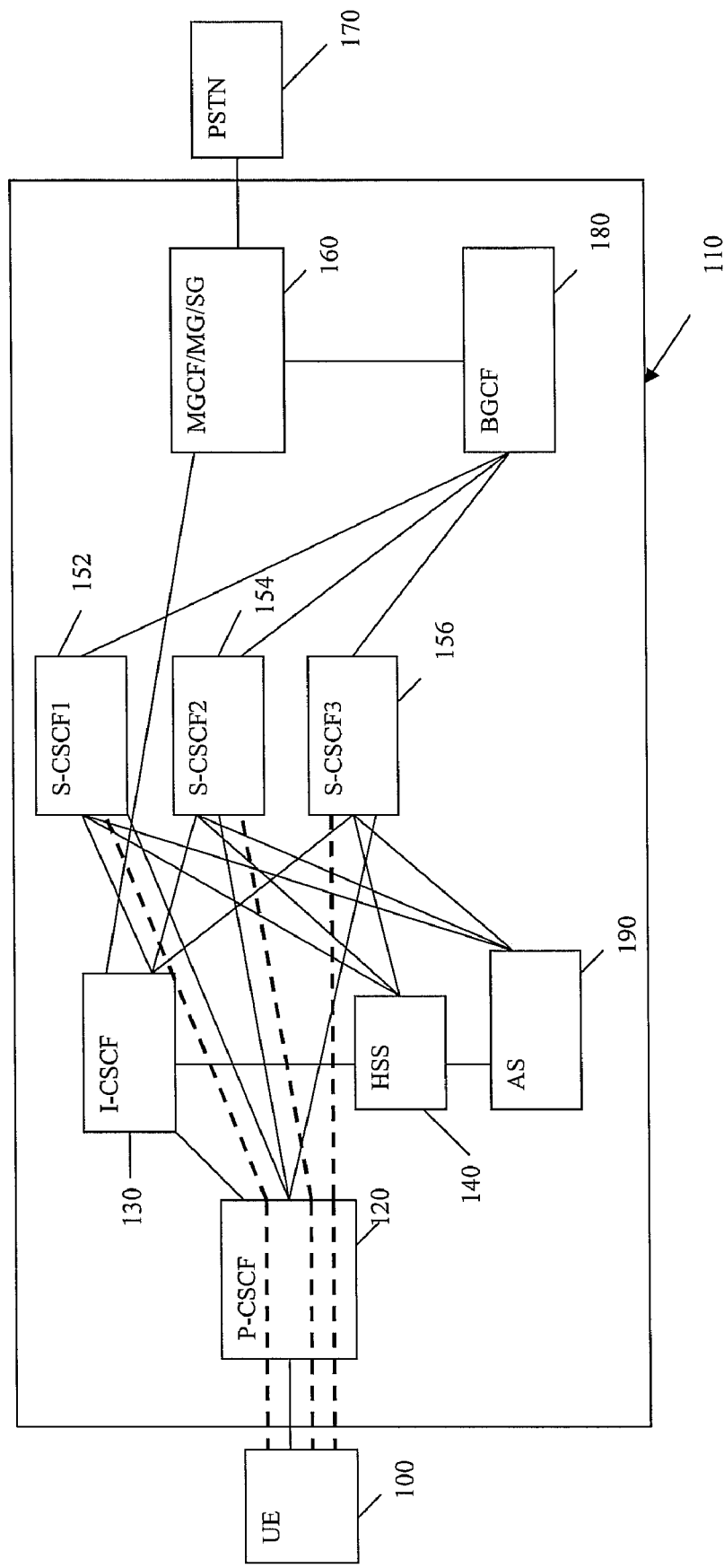
FIG. 1 is a schematic block diagram of an illustrative IMS connected to a PSTN.

Turning first to FIG. 1, a subscriber user equipment (UE; 100) is shown connected to an IP multimedia subsystem network (IMS; 110) that operates with the novel registration forking ability, and post-registration operation. UE (100) is shown connected to a proxy call session control function (P-CSCF; 120). The I-CSCF (130) connects to a Home Subscriber Server (HSS; 140). The HSS (140) is connected to an application server (AS; 190). Each of the P-CSCF, I-CSCF (130), HSS (140) and AS (190) is connected to multiple serving call session control functions (S-CSCF1, 152; S-CSCF2, 154; S-CSCF3, 156). The multiple S-CSCFs are connected to a breakout gateway control function (BGCF; 180). The BGCF (180) is connected to a media gateway control function (MGCF/MG/SG; 160), which in turn may connect to the public switched telephone network (PSTN;

170). MGCF/MG/SG (160) is also connected to the I-CSCF (130) to accommodate inbound calling.

After initial registration, multiple security associations (SAs) exist between the single UE, the single P-CSCF and the multiple fork registered S-CSCFs, as indicated by the broken lines. This indicates that the P-CSCF to I-CSCF connection will no longer exist after registration is forked. It should be noted that the three (3) multiple S-CSCFs and 3 corresponding security associations (SAs) between P-CSCF and UE are shown for explanatory purposes only. The disclosed technology is not limited to registering a single UE to three multiple S-CSCFs, but rather may involve the registration of a single UE to any number of S-CSCFs according to need, theoretically, e.g., 2, 4, 5, 6, 7 . . . N, or constrained by other factors, such as the size of the data field, etc., without limitation. Moreover, the IMS composition as shown is presented only for explanation purposes and is not meant to limit the inventive scope in any way. Operation of the IMS network and inventive method will become apparent by reading the following description in view of the drawing figures.

Figure 2:
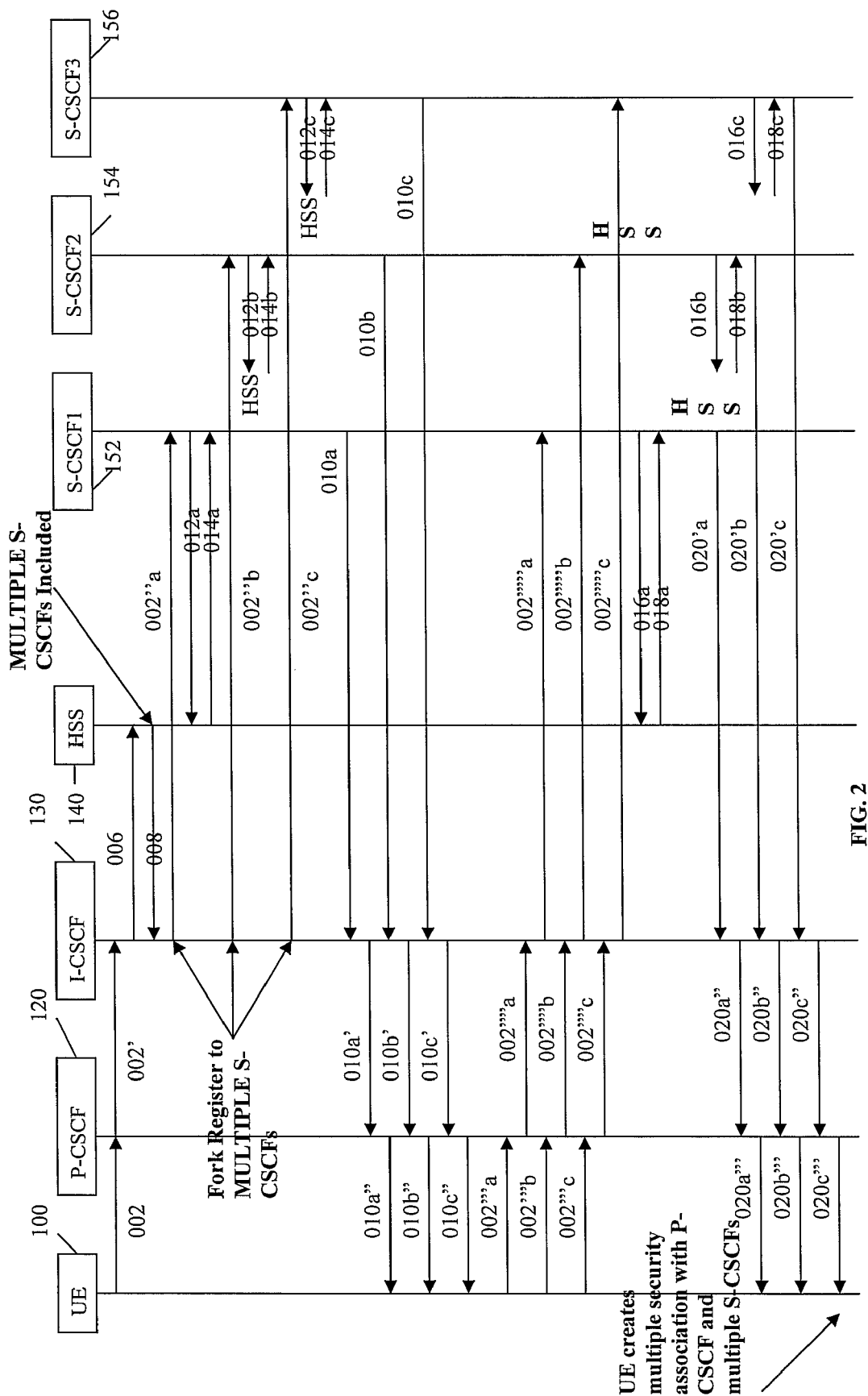
FIG. 2 is a signal flow diagram for UE registration with S-CSCF forking ability in accordance with the disclosed technology.

FIG. 2 presents a flow diagram depicting signalling exchanges between the UE (100) and the IMS (110) components during forking registration, i.e., registering the UE to multiple S-CSCFs. The HSS (140) includes a stored data field that is set to indicate that the UE may be fork registered. The data field can include other data such as the multiple S-CSCFs or the number or capability of the S-CSCF to which the single UE will be fork registered. The terms signal, message, messaging signal, signalling and exchange signalling are used interchangeably herein to describe the SIP-based signal exchange between the UE (100) and the IMS components, and between the IMS and PSTN (170).

Initially, UE (100) obtains connectivity (i.e., boots up) and sends an SIP registration signal (002) to P-CSCF (120). The P-CSCF then sends a registration signal (002') to the I-CSCF (130). The registration information in signal (002') includes the P-CSCF address/name, the single UE public user identity (PUID, the UE private user identity (PRID), the P-CSCF network identifier and the UE IP address. The I-CSCF (130) then sends a UAR (user authorization request) signal (006) to HSS (140), which includes the UE public user identity (PUID), the UE private user identity (PRID) and the P-CSCF network identifier. The HSS processes the message to determine whether the user (UE) is already registered with the IMS. The HSS then determines and indicates whether the user is allowed to register in the identified P-CSCF network in accordance with the UE subscription and operator limitations/restrictions, if any.

A UAA (user authorization answer) signal (008) is sent by the HSS (140) to I-CSCF (130). The UAA signal (008) includes the eligible S-CSCF names, if known by the HSS, or the capabilities of the eligible S-CSCFs if it is necessary to select a new set of S-CSCFs, along with the multiple S-CSCF indicator. Upon receipt of the UAA signal and capabilities, the I-CSCF performs the new S-CSCF selection function based thereon. With the multiple S-CSCF indicator field activated, the I-CSCF chooses multiple S-CSCFs for the UE (100) registration (e.g., S-CSCF1 (152), S-CSCF2 (154), S-CSCF3 (156)). The I-CSCF, using the names of the multiple S-CSCFs, determines the corresponding addresses through a name/address resolution mechanism, and then sends the register information (P-CSCF address/name, UE public user identity (PUID), UE private user identity (PRID), P-CSCF network identifier, UE IP address) to each of the chosen multiple S-CSCFs: S-CSCF1 (152), S-CSCF2 (154) and S-CSCF3 (156), indicated by multiple register request signals (002"a, 002"b, 002"c).

Each of S-CSCF1 (152), S-CSCF2 (154) and S-CSCF3 (156) respond by sending respective MAR (multimedia authentication request) signals (012a, 012b, 012c) to HSS (140). The MAR signal comprises the UE public user identity (PUID), UE private user identity (PRID) and S-CSCF name. The HSS responds by returning respective MAA (multimedia authentication answer) signals (014a, 014b, 014c) to each of S-CSCF1 (152), S-CSCF2 (154) and S-CSCF3 (156)

Each of the three S-CSCFs (152, 154, 156) chooses authentication vector and then responds by sending 401 unauthorized ("challenge") signals (010a, 010b, 010c) to the I-CSCF (130), to challenge the UE (100). The I-CSCF responds by sending three challenge signals (010a', 010b', 010c') to the P-CSCF (120). The P-CSCF forwards all three of the received signals to the UE (100) as challenge signals (101a", 010b", 010c"). The UE then sends three register signals with credentials (002""a, 002""b, 002""c) to P-CSCF (120) and creates three SA connections between UE to P-CSCF and S-CSCF. Based on the previously received challenge signals, the P-CSCF (120) transmits three register signals with credentials (002""a, 002""b, 002""c) to I-CSCF (130). The I-CSCF responds by sending three register signals (messages) with credentials (002""a, 002""b, 002""c) to the multiple respective S-CSCFs: S-CSCF1 (152), S-CSCF2 (154) and S-CSCF3 (156).

After receiving the register signals with credentials, each of S-CSCFs will authorize the user. Then each of S-CSCF1 (152), S-CSCF2 (154) and S-CSCF3 (156) transmits respective CX-SAR (server assignment request) signals (016a, 016b, 016c) to HSS (140). The HSS stores all of the S-CSCF names for that user (UE). The HSS then transmits respective SAA (server assignment answer) signals (018) to each of S-CSCF1 (152), S-CSCF2 (154) and S-CSCF3 (156). In response, each of S-CSCF1 (152), S-CSCF2 (154) and S-CSCF3 (156) then returns respective "200 OK" signals (020a', 020b', 020c') to the I-CSCF (130). I-CSCF (130) then sends "200 OK" signals (020a", 020b", 020c") to the P-CSCF (120), and then saves all registration information. The P-CSCF stores the home network contact information for all S-CSCFs, and transmits all three "200 OK" signals (020a''', 020b''', 020c''') to UE (100), finishes creating three SAs with the UE and completes the registration with S-CSCF forking.

Figure 3:
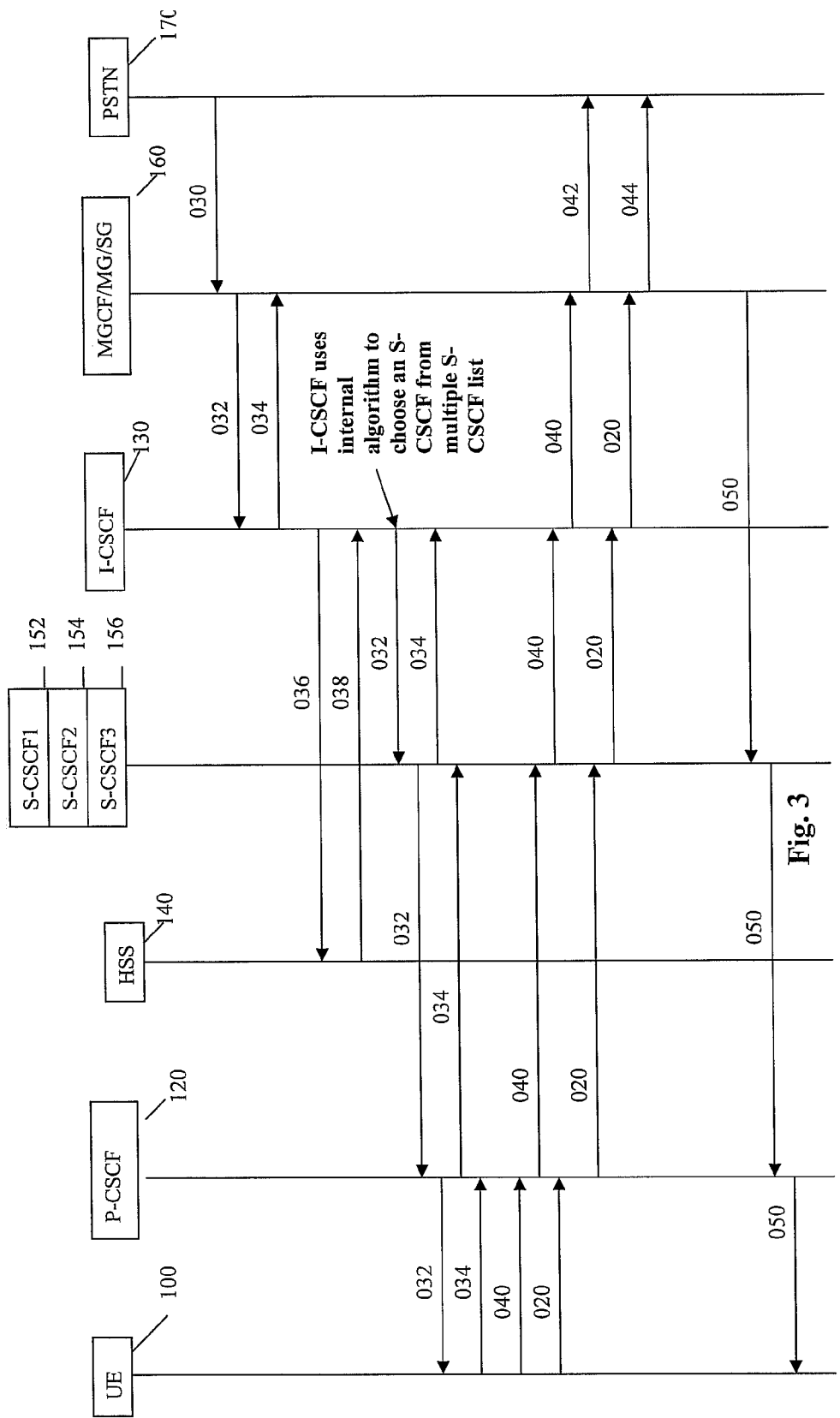
FIG. 3 is a signal flow diagram for an inbound call setup that makes use of post-registration forking ability of the disclosed technology.

FIG. 3 presents a signal flow diagram depicting signal exchanges between the PSTN (170) and IMS components, including MGCF/MG/SG (160), for an inbound call setup after forking registration. An incoming call setup is initiated by the PSTN sending an ISDN user part initial address message (ISUP IAM) signal (030) to an originating MGCF/MG/SG (160). The MGCF/MG/SG maps IAM message to SIP INVITE and sends an SIP invite signal (032) to the I-CSCF (130). The I-CSCF responds by sending an SIP "100 trying" signal (034) back to the MGCF/MG/SG, and a diameter LIR (location info request) signal (036) to HSS (140). The HSS responds by sending the I-CSCF (130) an LIA (location info answer) signal (038) with multiple S-CSCF information in view of the fact that the UE (100) is registered to multiple S-CSCFs by the initial registration process (FIG. 2).

In response, the I-CSCF chooses an S-CSCF from the multiple S-CSCF list (i.e., S-CSCF1 (152), S-CSCF2 (154) and S-CSCF3 (156)). The choosing may be carried out using an internal algorithm or may be based on an indication comprising the LIA (location info answer) signal (038). Once determined, the I-CSCF (130) sends an invite signal (032') to the single S-CSCF (S-CSCF1 (152), C-CSCF2 (154) or S-CSCF3 (156) for the terminating party. Upon receiving the invite signal (032), the single chosen S-CSCF responds by sending a "100 trying" signal (034) back to the I-CSCF and identifying the called party by the R-URI contained therein.

The S-CSCF applies an initial filter criteria (iFC) in the user profile for the identified called party. Based on the called party filter criteria and profile, the S-CSCF invokes any required services. When it determines there are no other services to be invoked, the S-CSCF sends the invite message (032) to the P-CSCF (120) based on the contact information cached during the registration process for the UE SA. The P-CSCF responds by sending a "100 trying" message (034) back to the chosen S-CSCF. The P-CSCF then sends the invite signal (032) to the UE via the SA that is set up during the forking registration process, which responds by sending a "100 trying" message (034) back to the P-CSCF (120).

In addition, the UE (100) sends a 180/183 message (040) and a 200 OK message (020) to the P-CSCF (120). The P-CSCF relays/sends a 180/183 message (040) and a 200 OK message (020) to the chosen S-CSCF. The particular S-CSCF relays/sends a 180/183 message (040) and a 200 OK message (020) to the I-CSCF (130), which relays/sends similar signals (040; 020) to the MGCF/MG/SG (160). The MGCF/MG/SG (160) maps and sends both an ACM (acknowledge) signal (042) and an ANM (answer) signal (044) to the PSTN (170). The MGCF/MG/SG further responds by sending an ACK signal (050) to the chosen S-CSCF, which relays/sends an ACK signal (050) to the P-CSCF, which responds by relaying/sending an ACK signal (050) to the UE (100), as shown. As mentioned above, the SIP INVITE (032) for an inbound call to the UE can be originated from an S-CSCF in an originating IMS network.

Figure 4:
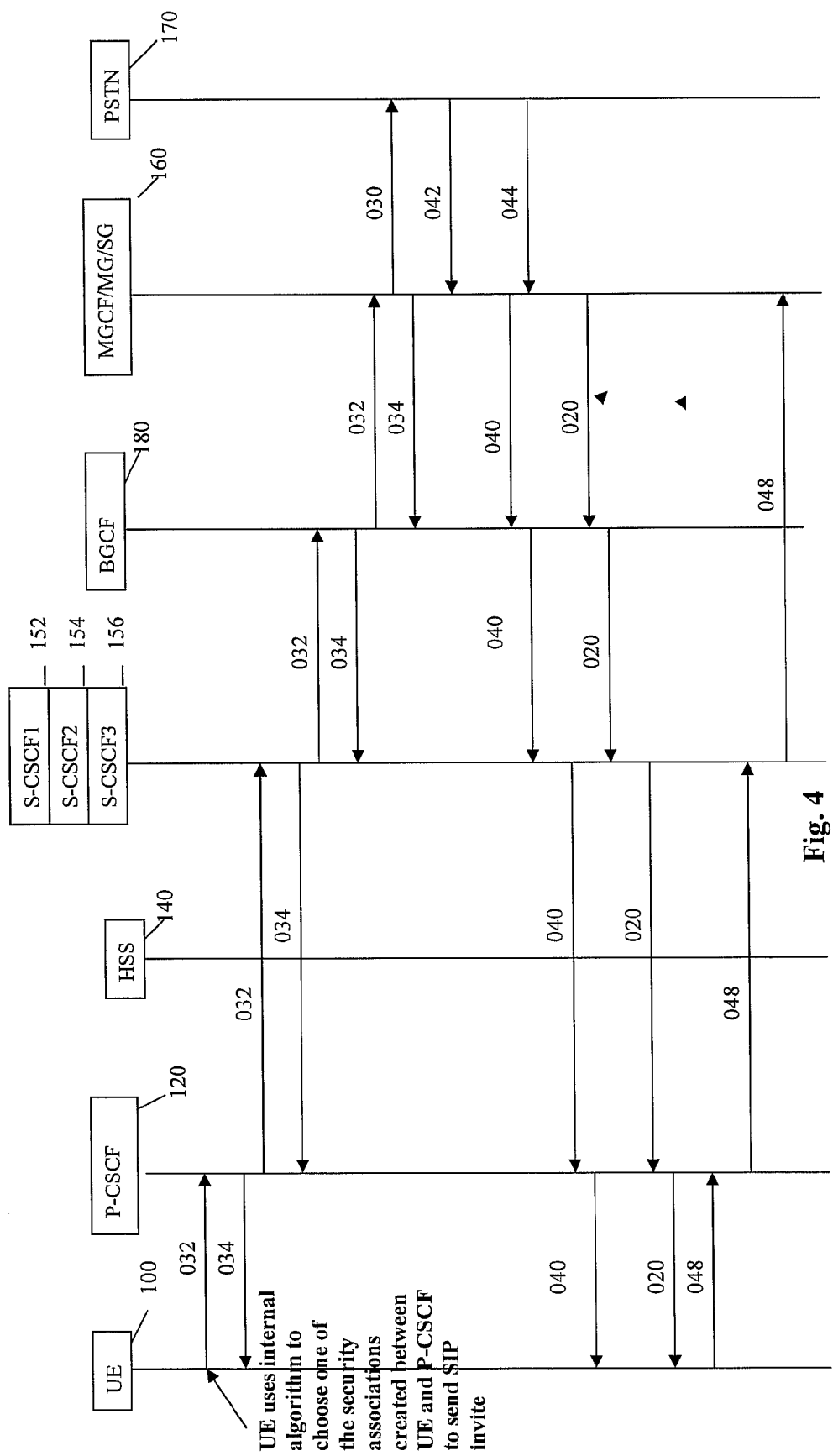
FIG. 4 is a SIP signalling flow diagram for outbound call setup that makes use of post-registration forking ability of the disclosed technology.

FIG. 4 presents a signal flow diagram depicting signal exchanges between the UE (100), the IMS components including a BGCF (180) and a MGCF/MG/SG (160) for outbound call setup, after initial SIP registration. To initiate an outbound call session, the UE (100) chooses one of the SAs that were created during the registration process, and sends an invite signal (032) to the P-CSCF (120). The choosing may be based upon use of a round robin, or some other algorithm implemented by the UE. The P-CSCF responds with a 100 trying signal (034). The P-CSCF verifies the customer and signals the associated S-CSCF that the UE is fork registered pursuant to the registration process (FIG. 2): The P-CSCF then relays/sends an SIP Invite signal (032) to the selected S-CSCF.

After responding SIP Invite from the P-CSCF with 100 Trying (034), the selected S-CSCF uses the PUID associated with the UE (100), and determines if there are originating services that apply to this call. If yes, the originating service processing will be performed. When there are no originating services or no more originating services that apply to this call, the S-CSCF performs an ENUM dip, and identifies the SIP URI for the destination user. If it is a positive response, the S-CSCF will forward (send) an invite signal to the I-CSCF in the terminating network, but if it is a negative response, an SIP Invite signal (032) is relayed/sent to the BGCF (180).

SIP Invite signal (032) is then relayed/sent from the BGCF to the MGCF/MG/SG (160). The MGCF/MG/SG (160) sends an ISUP LAM signal (030) to the PSTN (170). The terminating network responds by sending both an ACM message (042) and an ANM message (044) to the MGCF/MG/SG (160), which sends an 180/183 message (040) and a 200 OK message (020) to the BGCF (180). The BGCF (180) relays/sends a 180/183 message (040) and a 200 OK message (020) to the chosen S-CSCF (152, 154 or 156). The S-CSCF then relays/sends a 180/183 message (040) and a 200 OK message (020) to the P-CSCF (120), which sends corresponding signals (040; 020) to the UE (100). The UE (100) sends an ACK signal (048) back to the P-CSCF (120), which relays/sends an ACK signal (048) to the chosen S-CSCF (152, 154 or 156). The S-CSCF relays/sends an ACK signal (048) to the MGCF/MG/SG (160).

Figure 5:
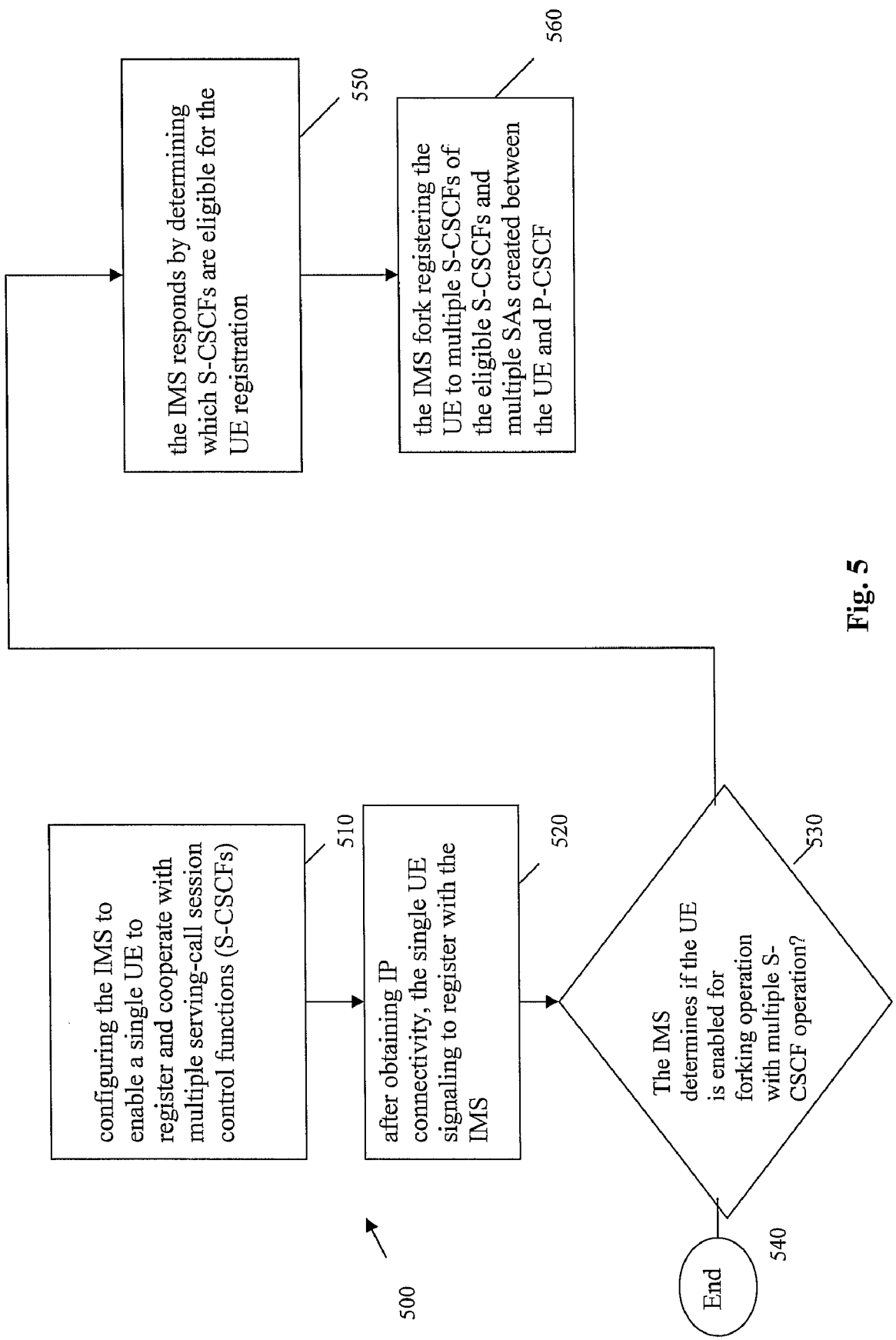
FIG. 5 is a flow diagram depicting one method for registering a UE with forking ability to multiple S-CSCFs of the disclosed technology.

FIG. 5 presents a flow chart depicting the steps of a method (500) for providing multimedia services to subscriber user equipment (UE) within an IP multimedia subsystem network (IMS). Block (510) is a step of configuring the IMS to enable a single UE to register and cooperate with multiple serving-call session control functions (S-CSCFs). Block (520) is a step wherein, after obtaining IP connectivity, the single UE signals to register with the IMS. Block (530) is a decision step wherein the IMS determines whether the UE is enabled for multiple S-CSCF operation. Block (540) is a method end decision indicator branched to if the UE is not enabled for multiple S-CSCF operation. Block (550) is a step that is branched to if the UE is enabled for multiple S-CSCF operation, by which the IMS determines which S-CSCFs are eligible for the UE registration. Block (560) is a step of the IMS fork registering the UE to multiple S-CSCFs of the eligible S-CSCFs and multiple SA created between the UE and P-CSCF.

The various method embodiments of the disclosed technology will be generally implemented by a computer executing a sequence of program instructions for carrying out the steps of the method, assuming all required data for processing is accessible to the computer. The sequence of program instructions may be embodied in a computer program product comprising media storing the program instructions.

As will be readily apparent to those skilled in the art, the disclosed technology can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the method, and variations on the method as described herein. Alternatively, a specific use computer, containing specialized hardware for carrying out one or more of the functional tasks of the disclosed technology, could be utilized.

The computer program product may comprise media, for example a compact storage medium such as a compact disc, which may be read by a processing unit within the computer/server system, or by any means known to the skilled artisan for providing the computer program product to the general purpose processing system for execution thereby. The computer program product comprises all the respective features enabling the implementation of the inventive method described herein, and which—when loaded in the computer/server system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for providing multimedia services to subscriber user equipment within an internet protocol multimedia subsystem network, comprising:
configuring the internet protocol multimedia subsystem network to provide a single subscriber user equipment with a capability of fork registering with multiple serving-call session control functions, wherein the configuring includes setting a multiple serving-call session control function forking data field for the single subscriber user equipment maintained by a home subscriber server; and wherein:
the single subscriber user equipment signals to fork register with a proxy call session control function;
the proxy call session control function signals to register with an interrogating call session control function;
the interrogating call session control function signals the home subscriber server,
the home subscriber server responds by determining whether the single subscriber user equipment is already registered, and whether the single subscriber user equipment is enabled to fork register to multiple serving-call session control functions, and signals the interrogating call session control function with eligible serving-call session control function capabilities if the multiple serving-call session control function forking data field is set; and
the interrogating call session control function responds by choosing the multiple serving-call session control functions from eligible serving-call session control functions, and register signalling the chosen, eligible multiple serving-call session control functions.

2. The method as set forth in claim 1, further comprising:
after obtaining internet protocol connectivity, the single subscriber user equipment signalling to register onto the internet protocol multimedia subsystem network; and
the internet protocol multimedia subsystem network responding by fork registering the single subscriber user equipment to multiple eligible serving-call session control functions.

3. The method as set forth in claim 1, further comprising:
the chosen multiple serving-call session control functions exchange signalling with the home subscriber server;
the home subscriber server recording a binding fork registration and sending subscriber user equipment profile information to each of the multiple fork registered serving-call session control functions;
each of the multiple fork registered serving-call session control functions responding by signalling the interrogating call session control function;
the interrogating call session control function responding by signalling the proxy call session control function with registration information, and the proxy call session control function responding by creating security associations and storing a list of the multiple fork registered serving-call session control functions.

4. The method as set forth in claim 3, further comprising:
the single subscriber user equipment using an algorithm to choose one of the security associations with the proxy call session control function and its associated registered serving-call session control functions in response to an outgoing call from the single subscriber user equipment.

5. The method as set forth in claim 4, further comprising:
if one of the multiple fork registered serving-call session control functions is determined by the single subscriber user equipment or the proxy call session control function to be unavailable for the outgoing call, the single subscriber user equipment choosing an alternative one of the security associations to reach an alternate fork registered serving-call session control function.

6. The method as set forth in claim 3, further comprising:
the interrogating call session control function using an algorithm to choose one of the multiple fork registered serving-call session control functions in response to an incoming call to the single subscriber user equipment.

7. The method as set forth in claim 6, further comprising:
if one of the multiple fork registered serving-call session control functions is determined by the internet protocol multimedia subsystem network to be unavailable for the incoming call, the interrogating call session control function choosing an alternative one of the multiple fork registered serving-call session control functions.

8. A non-transitory computer readable medium storing computer program instructions for providing multimedia services to subscriber user equipment within an internet protocol multimedia subsystem network, which, when executed on a processor, cause the processor to perform operations comprising:
configuring the internet protocol multimedia subsystem network to provide a single subscriber user equipment with a capability of fork registering with multiple serving-call session control functions, wherein: after obtaining internet protocol connectivity, the single subscriber user equipment register signals the internet protocol multimedia subsystem network; and wherein the internet protocol multimedia subsystem network fork registers the single subscriber user equipment to multiple serving-call session control functions; and
setting a multiple serving-call session control function forking data field and eligible serving-call session control functions maintained by a home subscriber server for the single subscriber user equipment; wherein:
the single subscriber user equipment signals to register with a proxy call session control function, the proxy call session control function register signalling an interrogating call session control function;
the home subscriber server determines whether the single subscriber user equipment is already registered, and whether the single subscriber user equipment is enabled to fork register;
the home subscriber server signals the interrogating call session control function with eligible serving-call session control function capabilities if the single subscriber user equipment is fork register enabled; and
the interrogating call session control function selects the multiple serving-call session control functions from the eligible serving-call session control functions and register signals the chosen, eligible multiple serving-call session control functions.

9. The non-transitory computer readable medium as set forth in claim 8, the computer program instructions further comprising:
the chosen multiple serving-call session control functions responding by exchanging signals with the home subscriber server;
the home subscriber server responding by recording a binding fork registration in the home subscriber server and sending subscriber user equipment profile information to each of the multiple fork registered serving-call session control function;

each of the multiple fork registered serving-call session control functions responding by signalling the interrogating call session control function;

the interrogating call session control function responding by signalling the proxy call session control function and releasing registration information; and the proxy call session control function responding by creating security associations and storing a list of the multiple fork registered serving-call session control functions.

10. The non-transitory computer readable medium as set forth in claim 9, the computer program instructions further comprising:

the single subscriber user equipment using an algorithm to choose one of the security associations with proxy call session control function and its associated registered serving-call session control function in response to an outgoing call from the single subscriber user equipment.

11. The non-transitory computer readable medium as set forth in claim 10, the computer program instructions further comprising:

if one of the multiple fork registered serving-call session control functions is determined by the single subscriber user equipment or the proxy call session control function to be unavailable for the outgoing call; the single subscriber user equipment choosing an alternative one of the security associations to reach an alternate forked registered serving-call session control function.

12. The non-transitory computer readable medium as set forth in claim 9, the computer program instructions further comprising:

the interrogating call session control function using an algorithm to choose one of the multiple fork registered serving-call session control functions in response to an incoming call to the single subscriber user equipment.

13. The non-transitory computer readable medium as set forth in claim 12, the computer program instructions further comprising:

if one of the multiple fork registered serving-call session control functions is determined by the interrogating call session control function to be unavailable for the incoming or an outgoing call; the interrogating call session control function choosing an alternative one of the multiple fork registered serving-call session control functions.

14. An internet protocol multimedia subsystem network for managing multimedia services that enables single subscriber user equipment to fork register with multiple servinq-call session control functions, the internet protocol multimedia subsystem network comprising:

a single subscriber user equipment;

a home subscriber server for managing operation of the single subscriber user equipment including a field indicating whether the single subscriber user equipment is enabled for multiple serving-call session control function operation; and multiple serving-call session control functions adapted to accept, in cooperation with the home subscriber server, fork registration from a single subscriber user equipment;

wherein the internet protocol multimedia subsystem network is adapted to respond to incoming and outgoing calls to/from the single subscriber user equipment, upon the single subscriber user equipment fork registering with the multiple serving-call session control functions, by choosing one of the multiple registered serving-call session control functions in cooperation with the stored fork registration information associated with the single subscriber user equipment.

15. The internet protocol multimedia subsystem network as set forth in claim 14, wherein the internet protocol multimedia subsystem network is adapted to use an alternative one of the multiple registered serving-call session control functions if one of the multiple registered serving-call session control functions is unavailable for an incoming or an outgoing call.

16. The internet protocol multimedia subsystem network as set forth in claim 14, further comprising a proxy call session control function and an interrogating call session control function, wherein the home subscriber server is adapted to return eligible serving-call session control functions to the interrogating call session control function which chooses the eligible serving-call session control functions for registration as the multiple registered serving-call session control functions.

17. The internet protocol multimedia subsystem network as set forth in claim 16, wherein the single subscriber user equipment is adapted to choose one of the security associations with the proxy call session control function to utilize for an outgoing call using a process from a group consisting of: a random choosing process, prioritized or weighted process and a process based on serving-call session control function capacity.

18. The internet protocol multimedia subsystem network as set forth in claim 16, wherein the interrogating call session control function is adapted to choose which of multiple registered serving-call session control functions to utilize for an incoming call using a process from a group consisting of: a random choosing process, a prioritized or weighted process and a process based on serving-call session control function capacity.

* * * * *